July 24, 1962  J. R. OISHEI  3,045,272
WINDSHIELD WIPER
Filed Sept. 1, 1959
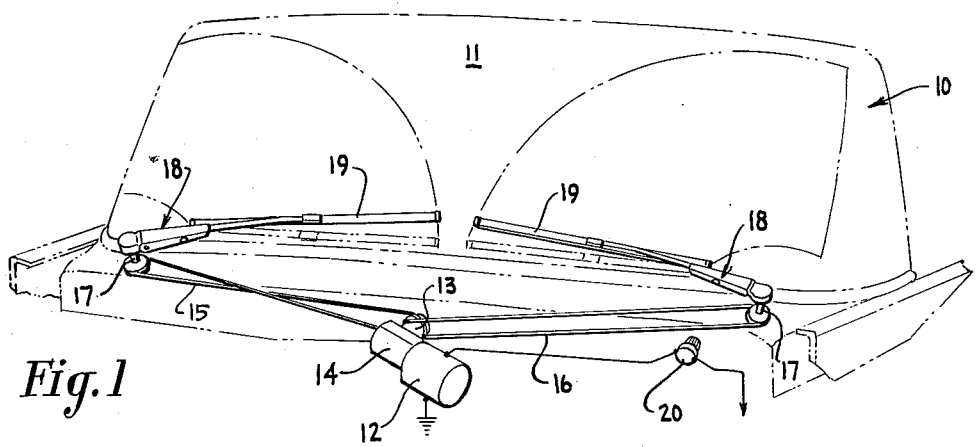
Fig. 1
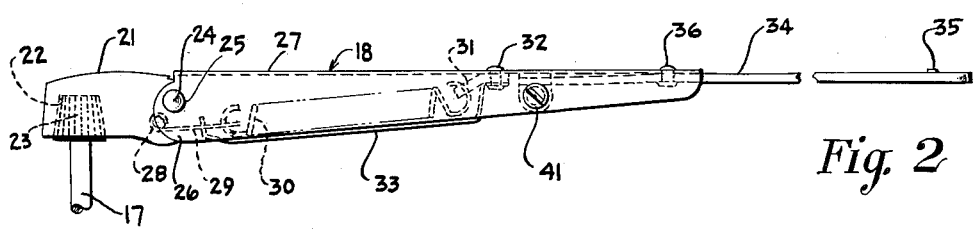
Fig. 2
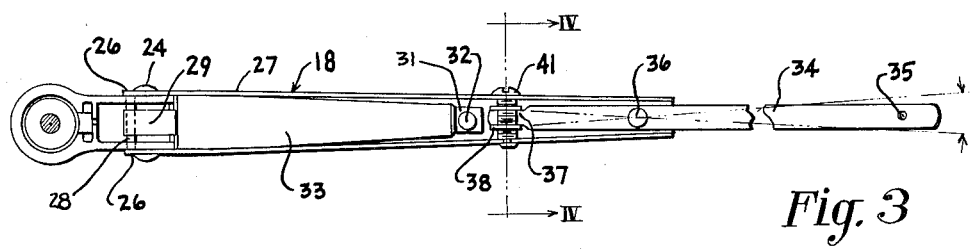
Fig. 3
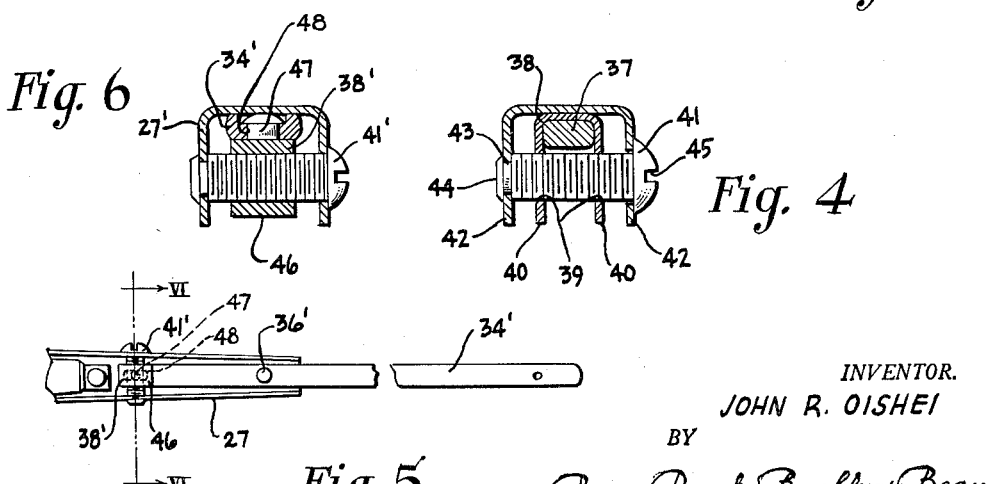
Fig. 6
Fig. 4
Fig. 5
INVENTOR.
JOHN R. OISHEI
BY
Bean Brooks Buckley & Bean.
ATTORNEYS.

United States Patent Office 3,045,272
Patented July 24, 1962

3,045,272
WINDSHIELD WIPER
John R. Oishei, Buffalo, N.Y., assignor to Trico Products
Corporation, Buffalo, N.Y.
Filed Sept. 1, 1959, Ser. No. 837,486
16 Claims. (Cl. 15—250.13)

The present invention relates to a windshield wiper arm having an improved construction for adjusting the wiper parking position of the arm.

It is an object of the present invention to provide a windshield wiper arm including a highly simplified construction which enables both the adjustment of the wiper arm to vary the angular position of a wiper blade on a windshield and the locking of the arm in its adjusted position by a single manipulation of a simple conventional tool without any requirement removing the arm from the rockshaft on which it is securely mounted, thereby permitting exact wiper alignment on a windshield in an extremely simple manner. Other objects and attendant advantages of the present invention will be readily perceived hereafter.

In accordance with the present invention, the wiper arm includes a mounting portion, a wiper carrying portion and an intermediate portion interposed therebetween. The mounting portion possesses the conventional serrated fluted bore which is adapted to fit on the driving burr mounted on the end of the wiper rockshaft, as is well known in the art. The intermediate portion is pivotally mounted on the mounting portion for movement toward and away from an associated windshield. The wiper carrying portion is pivotally mounted intermediate its ends on the end of the intermediate portion which is remote from the connection between the intermediate portion and the mounting portion. As is known, many times the positioning between the mounting portion and the burr on the rockshaft is such that the wiper blade carried by the wiper arm does not move to a position which is close to the windshield molding when the wiper is parked, especially when it is considered that the above-mentioned serrations in the bore may be spaced as much as five degrees apart. Therefore, in accordance with the present invention, an arrangement is provided between the intermediate and wiper carrying portions of the wiper arm to permit both lateral adjustment of the wiper arm and the retention of the wiper carrying portion in its adjusted position with a single manipulation of a screw-driver or the like. Because of this construction, exact alignment of the windshield wipers in their parked position may be effected in a relatively simple and efficient manner and the locking of the wiper arm in its adjusted position is assured without the necessity for providing structure which must be manipulated in addition to the structure which is utilized for effecting arm adjustment. The present invention will be more fully understood when the following portions of the specification are read in conjunction with the accompanying drawings wherein:

FIG. 1 is a fragmentary perspective view of an automotive vehicle containing the improved wiper arms of the present invention;

FIG. 2 is an elevational view of a preferred embodiment of the improved wiper arm of the present invention;

FIG. 3 is a bottom plan view of the wiper arm shown in FIG. 2;

FIG. 4 is a view taken along line IV—IV of FIG. 3;

FIG. 5 is a fragmentary bottom plan view of an alternate type of adjustment structure which may be utilized; and FIG. 6 is a view taken along line VI—VI of FIG. 5.

In FIG. 1 an automotive vehicle 10 is shown having a windshield 11 mounted thereon. An electric wiper motor 12 is suitably mounted on the vehicle firewall and is adapted to cause oscillation of drum 13 through gear-reducer and motion-transformer 14. Encircling drum 13 are cables 15 and 16 which also encircle rockshafts 17 suitably journalled in the vehicle cowl. Windshield wiper arms 18, which mount wiper blades 19, are mounted on the ends of rockshafts 17. As is well known in the art, whenever wiper motor 12 is placed in operation by completing an electrical circuit thereto as a result of the manipulation of switch 20 coupled between it and a battery (not shown), wiper blades 19 will oscillate back and forth across windshield 11.

It many times occurs that the windshield wiper arms 18 may be installed on rockshafts 17 in such a manner that they occupy too high a position on windshield 11 when they are in their parked position. In accordance with the present invention, an adjusting arrangement is provided to enable the wiper blades to be moved to a position which is closer to the bottom molding on the windshield (dotted position in FIG. 1).

As can be seen from FIGS. 2 and 3, wiper arm 18 includes a mounting portion or section 21 having an internally fluted bore 22 which is adapted to be placed in mating relationship with fluted burr 23. A pin 24 extends through mounting portion 21 and is received within aligned apertures 25 in ears 26 of intermediate arm portion 27 or section. A pin 28 is mounted in mounting portion 21 for the purpose of providing an anchor for one end of strap 29, the other end of which is suitably attached to one end of spring 30. The other end of spring 30 fits through an aperture (not shown) of link 31 which is, in turn, riveted to intermediate section 27 by rivet 32. A bottom cover 33 for the intermediate arm section 27 has one end thereof held in position by rivet 32 and the other end thereof provided with a slot (not shown) which substantially surrounds a portion of strap 29.

The wiper arm 18 also includes a wiper blade carrying portion 34 having a suitable wiper mounting member 35 at its outboard end. A central portion of wiper arm carrying portion 34 is pivotally mounted to intermediate section 27 by rivet 36. The inboard end of wiper arm carrying portion is reduced as at 37 and a clip or nut 38 (FIG. 4) is mounted thereon. The internal dimensions of clip 38 are such that it fits snugly on three sides of arm portion 37; however, there is no rigid connection between clip 38 and portion 37, thereby permitting freedom of movement of these parts during adjustment, as explained in greater detail hereafter. Clip 38 is tapped at 39 in its legs 40. A screw 41 is mounted for rotation in the depending sides 42 of channel-shaped intermediate arm section 27. The leg 42 which is adjacent the head of screw 41 has a bore therein which is of slightly larger diameter than the portion of the screw which it surrounds. The opposite end of screw 41 fits within aperture 43 of leg 42 and the end of screw 41 is peened at 44 to permit screw 41 to rotate, but prevent it from moving axially.

It can readily be seen that whenever an angular adjustment of wiper carrying section 34 is desired, it is only necessary to use a screw-driver to rotate screw 41. As screw 41 rotates, it will cause portion 37 of wiper blade carrying portion 34 to move from left to right or right to left in FIG. 4, depending on which way screw 41 is turned. Since clip 38 is not fixedly secured to reduced arm portion 37, both of these elements may move freely without binding when the screw 41 is rotated. It can further be seen that whenever the proper adjustment of blade carrying portion 34 has been effected, it is only necessary to remove the screw-driver from contact with screw 41, and that the blade carrying section 34 will remain in its adjusted position without any further manipulation. The reason that the adjustment is maintained is because the inclination of the threads on screw 41 are such that the exertion of a force on the end of section 34 is incapable of changing the adjustment. In other words, the adjustment mechanism comprises a gearing which is self-locking and irreversible by reason of any reactionary force transmitted from the wiper torque load. Furthermore, legs 40 of clip 38 tend to move in opposite directions (when viewed from FIG. 3) generally along the longitudinal axis of the arm as clip 38 moves along screw 41. This action creates a slight binding force between the clip and the screw which also assists in retaining arm 34 in its adjusted position. It will readily be appreciated that screw 41 may be supplied with a wrench-receiving head rather than with a head having a screwdriver receiving slot 45.

An alternate embodiment of the present invention is shown in FIGS. 5 and 6. The blade carrying arm section 34' is pivotally mounted on rivet 36' in the same manner as described above relative to FIGS. 2 and 3. Furthermore, screw 41' is mounted in arm 27' in the same manner as described above, relative to screw 41. The embodiment of FIGS. 5 and 6 differs from that described above relative to FIGS. 2 and 3 in that the screw-receiving clip 38' consists of a tapped sleeve or nut 46 having a rivet portion 47 of reduced section extending from the upper end thereof. This rivet portion is adapted to extend through a suitable elongated aperture 48 in wiper blade carrying portion 34' and is adapted to be suitably headed after being assembled with portion 34'. The elongated aperture 48 is required to permit relative movement between clip 38' and the adjacent portion of arm section 34' during adjustment. Thus, in each of the illustrated embodiments of the invention, provision for play or lost motion in the connection between the nut and the wiper carrying section is utilized to avoid binding in the adjustment.

While preferred embodiments of the present invention have been disclosed, it is to be readily understood that the present invention is not to be limited thereto, but may be otherwise embodied within the cope of the following claims.

What is claimed is:

1. A windshield wiper arm comprising a mounting section, a wiper carrying section, an intermediate section interposed between said mounting section and said wiper carrying section, means for pivotally mounting said wiper carrying section on said intermediate section, and unitary means for both causing said wiper carrying section to pivot relative to said intermediate section to effect an adjustment of said wiper carrying section and for automatically maintaining said wiper carrying section in fixed relationship on said intermediate section as soon as said wiper carrying section reaches its adjusted position without the requirement for additional manipulation of said unitary means thereafter.

2. A windshield wiper arm comprising a mounting portion, a wiper blade carrying portion, an intermediate portion operatively interposed between said mounting portion and said blade carrying portion, and unitary means for both producing lateral adjustment of said wiper blade carrying portion relative to said intermediate portion and for automatically maintaining said blade carrying portion in fixed position relative to said intermediate portion as soon as said wiper blade carrying portion reaches its adjusted position without the requirement for additional manipulation of said unitary means thereafter.

3. A windshield wiper arm comprising a mounting portion, a wiper carrying portion, an intermediate portion, means for mounting one end of said intermediate portion on said mounting portion, means for pivotally mounting said wiper carrying portion intermediate its ends on the other end of said intermediate portion, and unitary combined adjustment and locking means operatively coupled between said intermediate portion and an end of said wiper carrying portion for effecting pivotal movement of said wiper carrying portion about said pivotal mounting and for maintaining said wiper carrying portion in its adjusted position as soon as said wiper carrying portion reaches its adjusted position without the requirement for additional manipulation of said unitary means thereafter.

4. A windshield wiper arm as set forth in claim 3 wherein said combined adjusting and locking means comprise a threaded member rotatably mounted on said intermediate portion, and a mating threaded member mounted on said wiper carrying portion.

5. A windshield wiper arm comprising a mounting portion, a wiper blade carrying portion, an intermediate portion operatively interposed between said mounting portion and said blade carrying portion, a tapped clip mounted on said wiper blade carrying portion for movement relative thereto, and screw means operatively interconnecting said intermediate portion and said tapped clip for both effecting lateral adjustment of said wiper blade carrying portion relative to said intermediate portion and for automatically maintaining said blade carrying portion in fixed position relative to said intermediate portion at the termination of an adjusting operation.

6. A windshield wiper arm comprising a mounting portion adapted to be secured to a rockshaft, an intermediate portion, first pivot means coupling one end of said intermediate portion to said mounting portion to permit movement of said intermediate portion toward and away from an associated windshield, a wiper carrying portion, second pivot means mounted on the other end of said intermediate portion and being secured to said wiper carrying portion intermediate the ends thereof, said second pivot means having a pivot axis extending in a direction transverse to the pivotal axis of said first pivot means, a screw journaled for rotation in said intermediate portion, said screw having an axis extending in a direction transverse to the pivotal axis of said second pivot means, means for securing said screw on said intermediate portion against movement in the direction of said screw axis, a clip mounted on said wiper carrying portion and positioned between said first and second pivot means, said clip being tapped for mating engagement with said screw, whereby the rotation of said screw causes movement of said clip and thereby causes said wiper carrying portion to pivot about said second pivot means to thereby provide an adjustment of a wiper secured on said wiper carrying portion, said clip being retained in position on said screw when rotation of said screw ceases because of the threaded engagement therebetween and thereby cooperating with said screw to hold said wiper carrying portion in its adjusted position.

7. A windshield wiper arm as set forth in claim 6 wherein said clip includes a fastening portion having an axis which extends transversely to the tapped portion of said clip and wherein said wiper carrying portion includes an apertured portion for receiving said fastening portion of said clip to permit relative movement between said clip and said wiper carrying portion when said screw is rotated.

8. A windshield wiper arm comprising a mounting portion adapted to be secured to a rockshaft, an intermediate portion of channel-shaped configuration, first pivot means coupling one end of said intermediate portion to said mounting portion to permit movement of said intermediate portion toward and away from an associated windshield, an elongated wiper carrying portion, second pivot means on the other end of said intermediate portion for pivotally mounting said wiper carrying portion intermediate the ends thereof, said second pivot means having an effective pivot axis extending in a direction transverse to the pivotal axis of said first pivot means, said wiper carrying portion having an outer end adapted to mount a windshield wiper and an inner end located within said channel-shaped intermediate portion, a screw mounted for rotation on said intermediate portion, and means associated with said screw for providing an effective holding engagement with said inner end of said wiper carrying portion lying within said intermediate portion to hold the inner end of said wiper carrying portion in fixed relationship relative to said intermediate portion but permitting selective pivotal movement of said wiper carrying portion about said second pivot means to allow adjustment of said outer end of said wiper carrying portion.

9. A windshield wiper arm comprising a mounting portion, an elongate member mounted on the mounting portion for movement toward and away from an associated windshield, a wiper carrying member movably mounted on said first member for lateral adjustment, a screw journaled in bearing means on one member for rotation about a fixed axis, a cooperating nut having threaded engagement with the screw for axial movement thereon, and a play connection between the nut and the other of said members for effecting such lateral adjustment of a wiper carried on said wiper carrying member.

10. A wiper arm comprising a section for carrying a wiper, a second section movably supporting the first section for lateral adjustment thereon, a screw journaled on one section for rotation about an axis transverse of the arm, a nut part cooperating with the screw for being moved thereby back and forth when the screw is rotated clockwise and counterclockwise, and means operatively connecting the nut part to the other section for imparting infinite lateral adjustment to a carried wiper.

11. A windshield wiper arm comprising an elongate section having a channeled outer end, an elongate wiper-carrying section pivotally mounted in the channel of the first section for lateral adjustment, and a transversely arranged screw member supported in the opposing walls of the channel and having a nut threaded on the screw member for being driven back and forth axially of the screw by and upon the turning of the screw back and forth, said nut being operatively connected to said elongate wiper carrying section to effect such lateral adjustment.

12. A windshield wiper arm comprising an elongate section of channel formation, a second section projecting from the channel and adjustable sidewise therein for lateral parking adjustment of its outer end; and a park-adjusting unit including a screw journaled in the wall formation of the channel transversely of the latter, and a nut cooperating with the screw for movement thereby crosswise of the channel and operatively connected to the second section for effecting such lateral adjustment.

13. A windshield wiper arm according to claim 12, wherein the operative connection between the nut and the second section embodies a lost motion provision.

14. A windshield wiper arm comprising an elongate section having a channel part, an elongate wiper carrying section pivotally mounted within the channel of said part for lateral wiper-parking adjustment of its outer end, a screw journaled on said first section transversely of the channel, and a nut member threadedly engaging the screw for movement transversely of the channel and operatively connected to the wiper carrying section within the channel for effecting such lateral adjustment.

15. A windshield wiper arm comprising a mounting section, an elongate wiper carrying section, means pivotally mounting one section on the other section for lateral parking adjustment of an attached wiper, and self-locking unit for effecting such lateral adjustment including a screw on one section and a cooperating nut operatively connected to the other section with the thread pitch having an inclination incapable of changing the adjustment of the nut under the force exerted thereon by the torque wiper load.

16. A windshield wiper arm having a section of channel formation, an elongate outer section mounted in the channel for lateral adjustment, the outer end of the elongate section provided with means for attaching a wiper, a screw journaled in the side walls of the channel transversely thereof, and a nut arranged in the channel and engaged with the screw for being driven thereby crosswise of the channel, said nut being operatively connected to the outer section for effecting lateral adjustment of a wiper carried thereby.

References Cited in the file of this patent
UNITED STATES PATENTS
2,295,620     Zaiger _____ Sept. 15, 1942